United States Patent [19]

Kang

[11] Patent Number: 4,683,140
[45] Date of Patent: Jul. 28, 1987

[54] PROCESS FOR MANUFACTURING AN HERB TEA FROM THE LEAVES OF GINKO, PERSIMMON AND PINE

[76] Inventor: Kwon J. Kang, 807-3 Bangbae-Dong, Kangnam-ku, Seoul, Rep. of Korea

[21] Appl. No.: 765,534

[22] Filed: Aug. 14, 1985

[51] Int. Cl.⁴ .............................................. A23F 3/34
[52] U.S. Cl. .................................. 426/597; 426/489; 426/435; 424/195.1
[58] Field of Search ............... 426/590, 599, 615, 616, 426/330, 330.3, 330.5, 655, 481, 489, 477, 597, 425, 431, 435; 424/195.1, 196.1; 514/783

[56] References Cited

U.S. PATENT DOCUMENTS

| | | | |
|---|---|---|---|
| 685,853 | 11/1901 | Joie | 426/597 |
| 1,520,122 | 12/1924 | Gephart | 426/597 |
| 2,971,844 | 2/1961 | Bosanac | 426/597 |
| 3,080,237 | 3/1963 | Bonotto | 426/597 |
| 3,113,028 | 12/1963 | Cooper | 426/597 |
| 4,357,361 | 11/1982 | Lunden et al. | 426/597 |

FOREIGN PATENT DOCUMENTS

| | | | |
|---|---|---|---|
| 2518406 | 6/1983 | Fed. Rep. of Germany | 424/195.1 |
| 200313 | 12/1982 | Japan | 424/195.1 |
| 125840 | 7/1984 | Japan | 426/616 |
| 146575 | 8/1984 | Japan | 426/599 |
| 44028 | 10/1984 | Japan | 426/597 |
| 1009394 | 4/1983 | U.S.S.R. | 426/597 |

OTHER PUBLICATIONS

Mogi J. of the Society of Brewing, 66 (7), 720, 1972, abstract only.

*Primary Examiner*—Raymond N. Jones
*Assistant Examiner*—Carolyn Paden
*Attorney, Agent, or Firm*—Birch, Stewart, Kolasch & Birch

[57] ABSTRACT

The present invention relates to a process for manufacturing a nutrient herb tea from the genus Ginko, Persimmon and Pine. The nutrient extract composition is prepared from leaves of the species *Ginko biloba L., Diospyros kaki L.* and *Pinus monophylla* or *Pinus cembra*. A method for preparing the nutrient extract composition, comprises the steps of providing an initial mixture of 70% by weight of Ginko, 20% by weight of Persimmon and 10% by weight of Pine to form an initial mixture; soaking the initial mixture in water at about 15° C. for three hours; heating the mixture at about 100°–130° C. for about 10–15 minutes; filtering the aqueous mixture to produce an extract to form the herb tea.

7 Claims, No Drawings

PROCESS FOR MANUFACTURING AN HERB TEA FROM THE LEAVES OF GINKO, PERSIMMON AND PINE

BACKGROUND OF THE INVENTION

The present invention relates to a process for manufacturing a herb tea from natural substances, namely Ginko, Persimmon and Pine, and the composition produced thereby. More particularly, the present invention relates to a nutritious composition utilizing extracts of the leaves obtained from a combination of the Ginko, Persimmon and Pine trees. Still further, the present invention pertains to a nutrient composition containing extract of the leaves of *Ginko biloba L., Pinus monophylla* and *Diospyros kaki L.*

There are many type of known teas made from natural substances such as persimmon and/or pine leaves. However, it is unknown to provide a herb tea made from the leaves of Ginko, Persimmon and Pine. The only known prior art is found in "Annals of Oriental Medicine" by Joon Huh. In this publication, there does not appear to be any ratio of the combination of substances or process for preparing a composition used to manufacture a herb tea as described hereinbelow. The "Annals of Oriental Medicine" discloses that Persimmon and Pine leaves can be used to relieve cerebro-vascular stroke and drunkeness and that they are also useful in the treatment of venereal diseases, artherosclerosis, hypertension, diabetes and anemia. Thus it is stated that if a patient chews a large number of leaves of Pine, he can help his rheumatism, neuritis and the shortness of breath and the heart palpitation symptoms associated with heart disease. Also, tea from Persimmon leaves can be used to relieve hypertension, heart disease, diabetes, and artherosclerois because the extracts from these leaves contain Vitamin A, C and K.

Fruits of Ginko which are roasted, are useful in the treatment of enuresis, sputum, cough, asthma and gonorrhea.

SUMMARY AND OBJECTS OF THE INVENTION

The present invention comprises a nutrient herb tea composition prepared by a process which comprises providing a predetermined quantity of leaves from the genus Ginko, Persimmon and Pine to form an initial mixture. The mixture is soaked for two to four, preferably three hours at a temperature of about 10° to 20° C., preferably 15° C. The mixture is then heated for about 15 to 30 minutes at a temperature of about 100°–130° C. After filtering the mixture and adding a sweetener to the filtrate, the extract is sterilized with heat at a temperature of 100° C. to manufacture the herb tea of the present invention. It is an object of the present invention to provide a proces for manufacturing a herb tea from Ginko, Persimmon and Pine leaves.

It is another object of the present invention to provide nutrient composition which utilizes the extract of Ginko, Persimmon and Pine leaves.

It is a further object of the present invention to provide a nutrient composition from Ginko, Persimmon and Pine leaves in the form of a liquid, granules or an extract.

DESCRIPTION OF PREFERRED EMBODIMENTS

Referring now in detail to the present invention, there is provided a nutrient composition for use in a herb tea, said composition being made from natural substances, namely Ginko, Persimmon and Pine. Initially, a quantity of leaves from the Ginko family of plants are harvested during the middle of August, before the leaves fall. The particular species of Ginko found useful for the subject composition is *Ginko biloba L.* The Persimmon is harvested in the same way as the Ginko. Its particular specie is *Diospyros kaki L.* A quantity of leaves from the Pine family of plants is harvested in summer because of their abundant flavor and green cellulose. The particular species of Pine are *Pinus monophylla* and *Pinus Cembra*. The combination of Ginko, Persimmon and Pine is provided in a ratio of about 70:20:10% by weight, respectively.

The predetermined quantity of Ginko, Persimmon and Pine leaves is incorporated into an aqueous environment to form an initial mixture. The mixture is placed in water for about two to four hours at a temperature of about 10° to 20° C. so that the bad smell and tannin taste is eliminated from the mixture. It is believed that the bad smell and tannin taste is reduced to approximately 40%.

After washing the mixture twice, the mixture is heated in a pressure pot with water at about 100°–130° C. for about 10-15 minutes. The combination of the mixture and water is provided in an approximate ratio of 1 Kg:30 l. By this time, the bad smell and tannin taste is reduced to about 30%.

The mixture is then filtered to produce an extract which contains 30% of the traditional smell and taste to be able to be used in a drink for human beings.

The extract has a light green color and a nutrient composition containing Vitamin A, C and K. A non-fructose is added to the extract in order to improve its taste for human beings.

The extract is then sterilized at a temperature of about 100°–110° C. The aqueous extract is then cooled by convective cooling and in particular, may be cooled by natural convection to produce a soft drink. In addition, the aqueous extract can be dried in a convection dried and then granulated for use as a tea.

In another embodiment, the aqueous extract is concentrated and evaported to form an extract formulation.

EXAMPLE 1

Approximately 70% by weight of Ginko leaves (species, *Ginko biloba L.*), 20% of Persimmon leaves (*Diospyros kaki L.*) and 10% of Pine (*Pinus monophylla* or *Pinus cembra*) are mixed and soaked in water for three hours at 15° C.

After washing the mixture two times, 30 l of water is added to 1 Kg of the mixture in a pressure pot and is heated up to approximately 110° C. for about 10 minutes.

The aqueous mixture is filtrated to produce an extract which is useful as a nutrient herb tea. At this time, a little sweetener can be added to the extract for improving the taste of the herb tea. Also, the extract with the fructose is boiled and sterilized at 100° C.

EXAMPLE 2

The combination and soaking procedures of Example 1 are repeated. The mixture containing 5% water is heated at a temperature of 130° C. for 10 minutes. Then the filtrate is evaporated and dried by a drier to form a solid. The solid is ground to form a granule formulation for use as a tea.

EXAMPLE 3

The combination and soaking procedures of Example 1 are repeated except that the soaking temperature of water is 40° C. for 20 minutes. The mixture is heated in a pressure pot at 130° C. for 10 minutes. After filtration the aqueous mixture is evaporated to form an extract formulation.

The invention being thus described, it will be obvious that the same may be varied in many ways. Such variations are not to be regarded as a departure from the spirit and scope of the invention, and all such modifications as would be obvious to one skilled in the art are intended to be inclued in the scope of the following claims.

What is claimed is:

1. A process for preparing a nutrient herb tea extract which comprises:
    (a) providing a predetermined quantity of leaves from the genus Ginko, Persimmon and Pine in an aqueous environment to form an initial mixture said predetermined quantity of leaves from the genus Ginko, Persimmon and Pine being present in an amount of about 70%, 20% and 10% by weight, respectively;
    (b) soaking the initial mixture in water at a temperature of about 15° C. for three hours;
    (c) heating the mixture in a pressure pot at a temperature of about 100°–130° C. for about 10–15 minutes; and
    (d) filtrating the aqueous mixture to produce said extract.

2. The process of claim 1 wherein the genus Ginko is *Ginko biloba L.*

3. The process of claim 1 wherein the genus Persimmon is *Diospyros kaki L.*

4. The process of claim 1 wherein the genus Pine is *Pinus monophylla* or *Pinus cembra*.

5. The process of claim 1 wherein heating is conducted at a temperature of about 120° C.

6. The process of claim 1 wherein soaking is conducted at a temperature of about 40° C. for about 20 minutes.

7. The process of claim 1, wherein a small amount of a sweetener is added to the extract.

* * * * *